United States Patent [19]

Hauge

[11] 4,154,799
[45] May 15, 1979

[54] DICALCIUM PHOSPHATE MANUFACTURE
[75] Inventor: Douglas O. Hauge, Lafayette, Calif.
[73] Assignee: United States Gypsum Company, Chicago, Ill.
[21] Appl. No.: 890,110
[22] Filed: Mar. 27, 1978
[51] Int. Cl.$^2$ ............................................. C01F 11/00
[52] U.S. Cl. ..................................... 423/158; 423/167; 423/308
[58] Field of Search ......................... 423/158, 167, 308
[56] References Cited

U.S. PATENT DOCUMENTS

| 3,919,395 | 11/1975 | Hauge | 423/167 |
| 4,012,491 | 3/1977 | Hauge | 423/167 |
| 4,029,743 | 6/1977 | Hauge | 423/167 |

FOREIGN PATENT DOCUMENTS 2531519  1/1977  Fed. Rep. of Germany.

Primary Examiner—O. R. Vertiz
Assistant Examiner—Wayne A. Langel
Attorney, Agent, or Firm—Kenneth E. Roberts; S. Kurlandsky; R. H. Robinson

[57] ABSTRACT

A process is described for highly efficient recovery of phosphate values from a wide range of phosphate rock including low grade phosphate rock material by leaching with a dilute sulfuric acid and precipitating phosphate values as dicalcium phosphate. Water savings are accomplished in the process by the use of sea water instead of fresh water.

7 Claims, 1 Drawing Figure

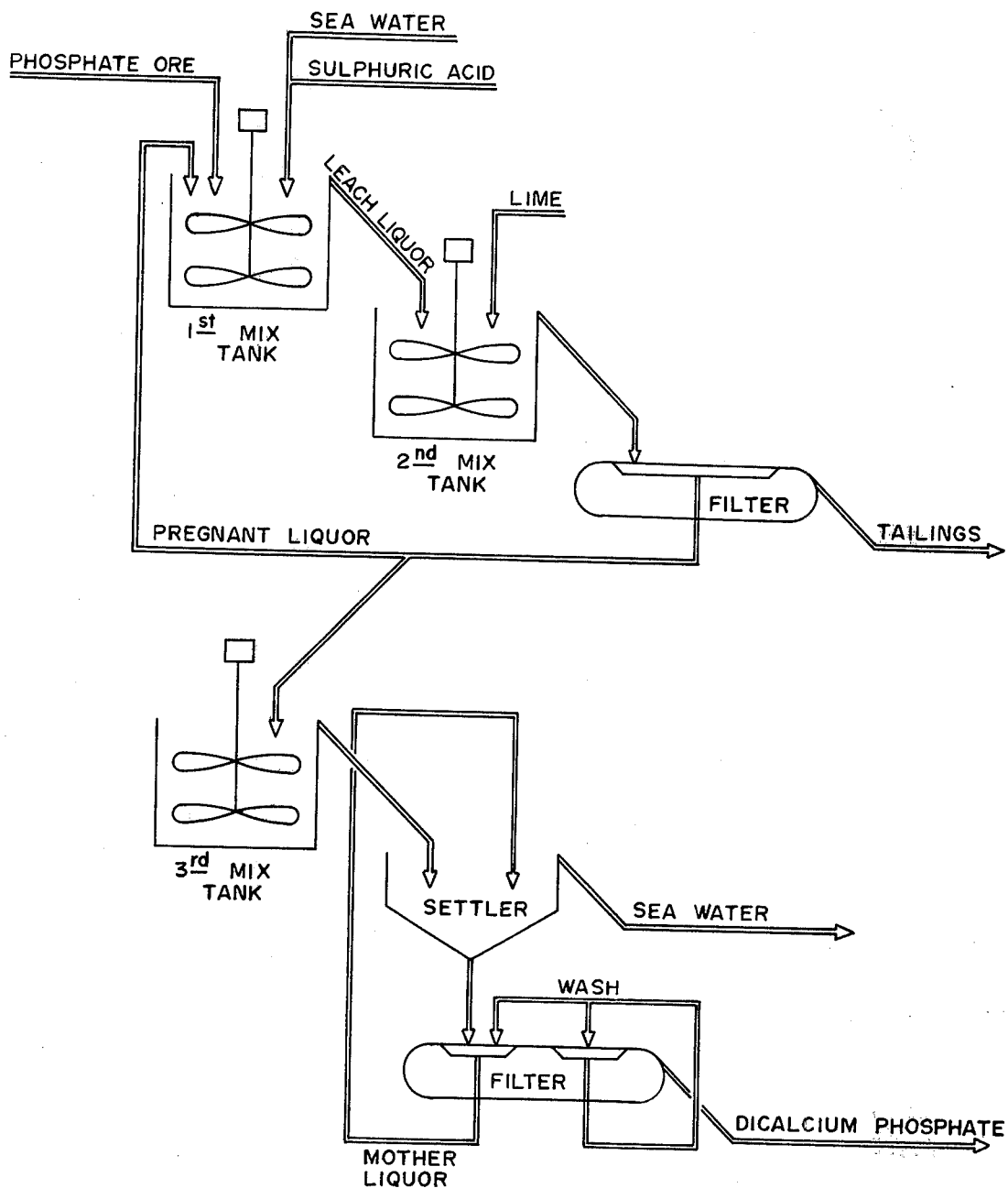

DICALCIUM PHOSPHATE MANUFACTURE

BACKGROUND OF THE INVENTION

This invention relates to an improved process for the recovery of dicalcium phosphate from phosphate rock or ore.

Various wet processes for producing phosphoric acid by acid treating phosphate rock have been described in the literature, such as in *Phosphoric Acid* edited by A. B. Slack (Marcel Dekker, Inc., New York, 1968). Those processes have focused upon the production of phosphoric acid and have been concerned with the treatment of high grade phosphate rock; and relatively little experience appears to be reported on either the handling of low grade phosphate rock or the production of precipitated dicalcium phosphates. U.S. Pat. Nos. 3,919,395 and 4,012,491 have provided processes for the manufacture of dicalcium phosphate using dilute mineral acids to digest a wide range of phosphate rock. These processes, however, require the use of large quantities of fresh water. Fresh water requirements are also necessitated, as far as it is known, in virtually all wet processes by acid treatment of phosphate rock.

BRIEF DESCRIPTION OF THE INVENTION

In much of the world fresh water is scarce and not readily available for industrial uses requiring copious quantities of water.

It is an object and advantage of the present invention to provide for the manufacture of dicalcium phosphate from phosphate rock with the efficient recovery of phosphatic values by dilute acid leaching without requiring the use of large quantities of fresh water.

Basically I have now found that mixing large quantities of sea water with a small quantity of sulfuric acid provides a dilute leaching solution for phosphate rock that is highly efficient. Mixing ocean sea water with small quantities of concentrated sulfuric acid to provide a three normal solution, thereby containing about 13% $H_2SO_4$ from the sulfuric acid and about 3% chloride ion from the sea water provides a leaching solution that is about 84% efficient in extraction of phosphate values from phosphate rock; and further, if some of the obtained pregnant liquor is recycled into this leaching solution an extraction efficiency of over 90% results. In explanation it appears that my U.S. Pat. No. 3,012,491 set forth a blend of hydrogen ion concentration, sulfate ion concentration, and chloride ion concentration that provided for highly efficient dilute acid leaching of phosphate values by mixing sulfuric acid and hydrochloric acid with fresh water. Apparently in the use of sea water which contains a number of natural chlorides providing about 3-4% total chloride ion from the various dissolved salts there is provided an amount of chloride ion in combination with the hydrogen ion and sulfate ion from the acid to inhibit solubilization of calcium ion from the apatite and the carbonate impurities of the phosphate rock to provide maximum solubilization of phosphate yet inhibition of dissolved calcium sulfate. Further, apparently, there is not quite enough chloride ion in natural ocean sea water to provide the exact optimum, but if a portion of the pregnant liquor, an about 5% $P_2O_5$ phosphoric acid solution containing disassociated calcium, chloride, and sulfate ions, is recycled into the first mixing zone then the efficiency of the optimum dilute acid leach mix of my U.S. Pat. No. 4,012,491 results without the use of any fresh water. However, as the exact mechanisms within the phosphate leaching zone are not completely and clearly understood, I do not wish to be bound by any particular theory of operation.

BRIEF DESCRIPTION OF THE DRAWING

The appended drawing is a labeled flow sheet of the process diagrammatically illustrating the conventional equipment and the flow lines employed.

DETAILED DESCRIPTION

Thus, in a preferred embodiment dicalcium phosphate is produced from rock phosphate by continuously feeding finely divided phosphate ore, sulfuric acid, and sea water to a first mixing zone and mixing them to form a slurry, the quantity of sulfuric acid in sea water charged being about equal to six equivalents of acid per mold of $P_2O_5$ content of the rock phosphate and about 3% by weight chloride per mole of $P_2O_5$ content of the rock phosphate, and the slurry during mixing being characterized by a pH in the range of about 0.8 to 1.2 and by a calcium ion content in the liquid portion of the slurry of about 3–4% by weight. A dilute slurry leach liquor containing about 5–7% $P_2O_5$ is continuously withdrawn from the first mixing zone. The withdrawn slurry is passed into a filter zone to separate spent material and the filtrate, comprising a dilute phosphoric acid leach liquor containing about 5–7% $P_2O_5$, is passed into a second mixing zone; and there mixed with a quantity of basic calcium material (such as quick lime, hydrated lime or calcium carbonate) to raise the pH to about 2–3 and cause a precipitation of impurities. The partly neutralized leach liquor is passed into a filter zone to separate a filter cake comprising the impurities and a pregnant liquor filtrate comprising a dical solution. The obtained filtrate is passed into a third mixing zone and there mixed with a further quantity of basic calcium compounds to provide a pH of about 3–5 and to precipitate dicalcium phosphate. These are passed into a filter zone to separate a filter cake comprising precipitated dicalcium phosphate and a filtrate comprising principally spent sea water which may be dumped or a portion thereof recycled. Most preferably a portion of the about 5–7% $P_2O_5$ phosphoric acid pregnant liquor is recycled to the first mixing zone and a portion of the mother liquor from washing the dicalcium phosphate is recycled to the third mixing zone to provide adjustments of dilution factors and ion concentrations for most efficient leaching and purification.

The equipment employed in the process is conventional. Further the first filtration and separation of tailings before partial neutralization is optional. Rather, as shown in the figure the leach liquor may be optionally partly neutralized with a basic calcium compound such as lime before a first filtration and the tailings will then include precipitated impurities.

The following examples will illustrate various specific embodiments, but are not to be construed as limitations on the present invention.

EXAMPLES

A dilute phosphoric acid pregnant liquor was produced by the process of the invention from a Baja phosphate ore that was high in silica and low in quantity of pebble grade material having the following composition:

| | |
|---|---|
| $P_2O_5$ | 20.8% |
| Fluoride | 2.2% |
| CaO | 24.0% |
| $Fe_2O_3$ | 0.9% |
| $Al_2O_3$ | 0.5% |
| MgO | 0.2% |

2.2 tons by weight of the Baja phosphate ore, 2.63 tons concentrated sulfuric acid and 15.1 tons of sea water were charged to the first mixing zone. At start up, all of these materials were fed to the first mixing zone from an outside source, but when steady state operation has been achieved, a portion of the dilute pregnant liquor is cycled to the first mixing tank. This recycle of pregnant liquor was found to extract the phosphate values from the ore to gain higher than 90% recovery. After a thorough mixing time, 2.14 tons of tailings were separated and discarded from the leach liquor. The leach liquor was, in a single step, neutralized with 2.2 tons of lime to result in the precipitation of one ton of dical and a separation of filtrate 1.05 tons spent sea water mostly calcium chloride.

In this first preliminary example, an analysis for $P_2O_5$ was performed after the extraction step in the first mixing zone. The tailings analyzed as containing 1.83% $P_2O_5$ and the pregnant liquor analyzed as containing 9.91% $P_2O_5$ for an efficiency of extraction of 91.5%.

In another example, as set forth in the FIGURE, 55.6 parts by weight of recycle pregnant liquor; 16.8 parts by weight of sea water; 1.3 parts by weight of 97% sulfuric acid and 15.5 parts by weight of the Baja phosphate ore were charged to the first mixing vessel (along with an additional 10.9 parts by weight of 60% sulfuric acid added after carbonation subsided) and thoroughly mixed at about 50° C. for about one hour. The leach liquor and tailings from the first mixing zone were separated, having the following compositions:

| Leach Liquor | |
|---|---|
| $P_2O_5$ | 10.5% |
| Fluoride | 0.3% |
| Chloride | 3.6% |
| $Fe_2O_3$ | 0.4% |
| $Al_2O_3$ | 0.2% |
| MgO | 0.08% |
| Tailings | |
| $P_2O_5$ | 1.5% |
| Fluoride | 0.2% |
| Chloride | 0.06% |
| $Fe_2O_3$ | 0.06% |
| $Al_2O_3$ | 0.09% |
| MgO | 0.02% |

The leach liquor was then partially neutralized to a pH of 1.97 in a second mixing zone and a pregnant liquor was separated from the precipitated solids by filtration, having the analysis as follows:

| Pregnant Liquor | |
|---|---|
| $P_2O_5$ | 9.77% |
| Fluoride | 0.1% |
| Chloride | 3.8% |
| $Fe_2O_3$ | 0.07% |
| $Al_2O_3$ | 0.06% |
| MgO | 0.02% |
| Solids | |
| $P_2O_5$ | 17.2% |
| Fluoride | 5.5% |
| Chloride | 0.06% |
| $Fe_2O_3$ | 5.8% |
| $Al_2O_3$ | 1.6% |
| MgO | 0.006% |

A portion of the pregnant liquor derived from separation of the impurities was neutralized with lime to a pH of about 3 so as to precipitate an agricultural dicalcium phosphate containing some impurities not previously removed and a first mother liquor, having the analyses set forth as follows:

| 1st Mother Liquor (pH=2.72) | |
|---|---|
| $P_2O_5$ | 9.0% |
| Fluoride | 0.03% |
| Chloride | 3.8% |
| $Fe_2O_3$ | 0.009% |
| $Al_2O_3$ | n/d |
| MgO | 0.09% |
| Agricultural Dical | |
| $P_2O_5$ | 35.5% |
| Fluoride | 7.8% |
| Chloride | 0.2% |
| $Fe_2O_3$ | 5.9% |
| $Al_2O_3$ | 4.4% |
| MgO | 0.03% |

The first mother liquor was further neutralized to a pH of about 4 to precipitate a hydrate dicalcium phosphate and a second mother liquor which was utilized as a recycle in the system, which had analyses as follows:

| 2nd Mother Liquor (pH=3.8) | |
|---|---|
| $P_2O_5$ | 0.3% |
| Fluoride | 0.03% |
| Chloride | 4.2% |
| $Fe_2O_3$ | n/d |
| $Al_2O_3$ | n/d |
| MgO | 0.1% |
| Clean Dical | |
| $P_2O_5$ | 40.1% |
| Fluoride | 0.06% |
| Chloride | 0.06% |
| $Fe_2O_3$ | 0.05% |
| $Al_2O_3$ | 0.02% |
| MgO | 0.005% |

It is clear that various grades, including a very good quality dicalcium phosphate product, are obtained from a low grade phosphate ore without the use of fresh water. Further, it is clear that virtually all of the water requirements for the extraction in a highly dilute fashion of phosphate rock is provided from sea water.

With many extensive phosphate deposits being located in arid regions where fresh water is in short supply yet access to sea water is abundantly available, it may be readily seen that though some phosphate values are lost in the process, this is more than offset by the savings in not being required to supply copious quantities of fresh water. The impurities contained in the tailings also include a quantum of calcium sulfate. In the event that it is desired to recover this calcium sulfate or to vary the impurities levels, then additional mixing tanks and filters are provided and the pH is increased in more gradual step-wise increments and the tailings are split into two or more parts, the latter of which are higher in calcium sulfate content which may be separated by other known processes.

What is claimed is:

1. A process for producing dicalcium phosphate from rock phosphate which comprises:
   (a) Continuously feeding finely divided rock phosphate, sulfuric acid, and sea water to a first mixing zone and mixing them to form a slurry, the quantity of sulfuric acid and sea water charged being about equal to six equivalents of acid per mole of $P_2O_5$ content of the rock and about 3% by weight chloride per mole of $P_2O_5$ content of the rock charged whereby the slurry is characterized by a pH in the range of about 0.8 to 1.2 and by a calcium ion content in the liquid portion of the slurry of about 3–4% by weight;
   (b) passing the slurry into a second mixing zone and there mixing it with a quantity of basic calcium material to raise the pH to about 2–3 and passing it into a filter zone to separate a filter cake comprising impurities and a filtrate comprising a dicalcium phosphate solution;
   (c) passing the filtrate into a third mixing zone and there mixing it with a further quantity of basic calcium material to a pH of about 3–5 and passing it into a filter zone to separate a filter cake comprising precipitated dicalcium phosphate and a filtrate.

2. The process as defined in claim 1 wherein a portion of the last filtrate is continuously returned to the first mixing zone.

3. The process as defined in claim 1 wherein a portion of the first filtrate is continuously returned to the first mixing zone.

4. The process as defined in claim 1 wherein a portion of the last filtrate is continuously returned to the last mixing zone.

5. The process as defined in claim 1 wherein said basic calcium material is hydrated lime.

6. The process defined in claim 1 wherein said basic calcium material is calcium carbonate.

7. The process as described in claim 1 wherein the slurry withdrawn from the first mixing zone is passed into a first filter zone to separate tailings and a filtrate comprising a dilute phosphoric acid leach liquor containing about 5–7% $P_2O_5$.

* * * * *